ns Patent [19]

Khoroshavin et al.

[11] 4,317,670
[45] Mar. 2, 1982

[54] MICROBIOLOGICAL PROCESS FOR RECULTIVATION OF INDUSTRIAL REFUSE HEAPS

[76] Inventors: Anatoly N. Khoroshavin, ulitsa gazety "Zvezda", 14, kv. 17; Irina V. Kataeva, bulvar Gagarina, 87, kv. 75; Gennady A. Oborin, ulitsa Tsentralnaya, 31, kv. 69; Alexandr P. Krasavin, ulitsa Poliny Osipenko, 56, kv. 57, all of Perm, U.S.S.R.

[21] Appl. No.: 109,533

[22] Filed: Jan. 4, 1980

[51] Int. Cl.$^3$ ............................................. C05F 11/08
[52] U.S. Cl. ................................................ 71/6; 71/9; 71/14; 71/25; 71/901; 71/902; 71/903; 47/9; 47/58
[58] Field of Search ............... 71/1, 12, 14, 23–25, 71/64 G, 64 SC, 64 JC, 6–9, 901, 902, 903, 904; 47/9, DIG. 10, 58

[56] References Cited

U.S. PATENT DOCUMENTS 3,233,976  2/1966  Varro, Jr. et al. ................. 71/14 X

FOREIGN PATENT DOCUMENTS 1026580  2/1978  Canada ................................ 71/7
 378219  7/1973  U.S.S.R. .......................... 71/64 SC

*Primary Examiner*—William F. Smith
*Assistant Examiner*—F. Lander
*Attorney, Agent, or Firm*—McAulay, Fields, Fisher, Goldstein & Nissen

[57] ABSTRACT

The present invention relates to the environment protection and, more specifically, to microbiological processes for recultivation of industrial refuse heaps.

The process of the present invention involves treatment of the heaps with fertilizers resulting from purification of production-communal waste waters, followed by treatment with a humic preparation containing a culture of the mold fungus *Aspergillus niger*. Then plowing of the ground is effected with a subsequent sowing with seeds of perennial plants. The heap surface sown with said seeds is inoculated with a bacterial preparation containing a culture of ammonifying and nitrifying bacteria.

During the period of the plant sprouting and tillering inoculation is effected by means of a bacterial preparation containing a culture of azotobacter and phosphate-dissolving bacteria. All these bacteria are recovered from said refuse heaps, wherefore they are already adapted thereto.

The process of the present invention is useful in the regions where it is necessary to convert refuse heaps to soil, e.g. in the regions of coal-mining and ore-mining industries.

7 Claims, No Drawings

4,317,670

MICROBIOLOGICAL PROCESS FOR RECULTIVATION OF INDUSTRIAL REFUSE HEAPS

FIELD OF THE INVENTION

The present invention relates to the environment protection and, more specifically, to microbiological processes for recultivation of industrial refuse heaps.

Production refuse heaps comprise waste materials in the mining industry which are accumulated as a result of open-cut works or underground production of various ores such as iron, phosphorus, manganese and other ores as well as oil shales and coal. Furthermore, refuse heaps are accumulated in thermal power stations and in metallurgy. Owing to the fact that said refuse heaps are detrimental to the environments and occupy large useful areas, there is a persistant need in recultivation thereof. The problem of recultivation of production refuse heaps is one of the most urgent problems of the environment protection.

BACKGROUND OF THE INVENTION

Known in the art is a conventional process for recultivation of production refuse heaps which comprises deposition, onto the surface of the refuse heaps, of a rich soil layer removed from other earth areas. This process, however, necessitates labour-consuming operations of transportation of the soil layer and results in deterioration of the natural soil formation. This requires additional capital investments for recovery of those earth areas, wherefrom the rich soil layer has been taken-off.

Known in the art is a process for recultivation of ash refuse heaps by way of biological fixation thereof using production and house-hold waste waters (cf. USSR Inventor's Certificate No. 515482).

According to this process, the surface area of the ash heaps is divided to trenches which are filled with non-purified production-communal waste waters to the depth of 20–30 cm, followed by plowing. Filling of trenches with production communal waste waters and subsequent plowing are carried out repeatedly (6–7 times). After these operations, the ash heaps are sown with perennial grass varieties, farm or industrial crops and sprinkled with water.

This prior art process has a disadvantage residing in a delayed soil-formation (cultivation). This is due to the fact that introduced into ash heaps are only production-communal waste waters containing organic compounds and biogenic agents which stimulate vital activity of not only useful microflora, but antagonist microorganisms which suppress the useful microflora.

Furthermore, the soil-formation process occurs but very slowly due to an insignificant content of soil microorganisms in ash refuse heaps.

It should be also noted that certain microorganisms present in production-communal wastes may be a source of infection for human beings, animals and plants. Known in the art is a process for recultivation of refuse rocks which resides in that refuse rocks are lowered by height and levelled, followed by smoothing in separated grounds with a slope of up to 1.5° positioned in a steplike manner (cf. USSR Inventor's Certificate No. 494139). On the preconditioned areas fruit trees are planted, followed by sowing of green manure crops; the rock is cultivated by deposition of the humus layer over a period of from 3 to 7 years and a full-range inoculation with soil microorganisms using preparations such as azotobacterin, nitragin (cf. USSR Inventor's Certificate No. 494139). The inclined faces of the grounds are stabilized with sowing of perennial grass varieties.

Among disadvantages of this prior art process are a long duration of the soil-formation, as well as labour-consuming character of the process. A long period of soil formation is due to the fact that soil is inoculated with the microorganisms which are not accomodated under the conditions of refuse rocks. Furthermore, a repeated deposition of humus results in densification and solidification of soil under the deposited humus layer. The hardened layer becomes impermeable, due to the lack of capillary water circulation, for vegetable crops, thus slowing down the process of soil development.

OBJECT OF THE INVENTION

It is an object of the present invention to develop such a microbiological process for recultivation of industrial refuse heaps which would make it possible to accelerate soil-development on industrial refuse heaps, facilitate their rapid landscaping, would be simple in realization and require no large capital investments.

SUMMARY OF THE INVENTION

The microbiological process for recultivation of industrial refuse heaps by way of treating same with fertilizers and biological active compositions, plowing, sowing with plants seeds and spraying with water according to the present invention is characterized in that involves the following steps performed in the succession specified hereinbelow:

(a) smoothing out said industrial refuse heaps;

(b) introduction of a fertilizer obtained from purification of production-communal waste waters (c) introduction, thereinto, of a humic compound containing a culture of a mold fungus *Aspergillus niger* producing humus and recovered from said heaps;

(d) plowing;

(e) sowing seeds of perennial plants;

(f) inoculation of heap surface sown with plant seeds with a bacterial preparation containing a culture of ammonifying and nitrifying bacteria isolated from said refuse heaps;

(g) inoculation of the heap surface with a bacterial composition containing a culture of Azotobacter and phosphorus-dissolving bacteria recovered from said refuse heaps during plant sprouting and tillering;

(h) watering of the plants.

In accordance with the present invention it is advisable to use said humic composition in the form of an aqueous suspension containing in 1 liter 4–7 g (calculated for dry solids) of the culture *Aspergillus niger* in an amount of 80–100 g of the active principle per 1 m$^2$ of the recultivated surface area. This composition is readily intermixed with particles of the refuse material and totally replaces the use of soil humus layer.

In accordance with the present invention the heap surface sown with plant seeds should be inoculated with microorganisms. The inoculation should be conducted using a preparation in the form of an aqueous suspension containing, in one liter, 0.1–0.2 g (as calculated for dry solids) of a culture *Bacillus mycoides*, 0.07–0.15 g of a culture *Nitrosomonas europea* and 0.08–0.15 g of a culture *Nitrobacter Winogradskii*. The amount of the preparation for inoculation ranges from 0.25 to 0.5 g of the active principle per 1 m$^2$ of the recultivated surface area. This preparation for the sake of brevity will be referred to hereinafter as "BNN" wherein the first Letters B, N, N stand for the first letter of bacteria names: Bacillus, Nitrosomonas, Nitrobacter.

The preparation BNN is well sprayed with water and sorbed by particles of the refuse material. The above-specified content of the active component in the preparation is sufficient for an efficient soil development.

In accordance with the present invention the heap surface should be inoculated during sprouting and tillering of plants. For inoculation in this case it is advisable to use a preparation in the form of an aqueous suspension containing, g/l (calculated for dry solids): 0.1–0.3 of a culture *Azotobacter chroacoccum* and 0.15–0.2 of a culture *Bacillus megaterium*. The amount of the preparation for inoculation is 0.25–0.5 g of the active principle per 1 $m^2$ of the recultivated surface area. This composition will be referred to hereinafter, for the purpose of brevity, as AB where letters A and B stand for the first letters of names of bacteria: Azotobacter and Bacillus.

The composition "AB" is also well sprayed with water and sorbed by particles of the refuse material. The above-specified content of the active principle in the preparation is sufficient for an effective development of microorganisms and synthesis thereby of nutrient substances necessary for plants.

The process for recultivation of industrial refuse heaps according to the present invention facilitates accomplishment of important tasks of protection of the environments and provides for landscaping of the recultivated territory.

Owing to the use of the humic preparation and inoculation with bacterial preparations BNN and AB there is eliminated deposition of an expensive soil rich (humus) layer onto the surface of recultivated refuse heaps. in the second year there is no need in any additional cultivation of the recultivated grounds, since there occurs a rapid process of soil-formation and sodding of the heap surface. Such grounds, 2-3 years after recultivation, may be used in agriculture for planting farm crops. These terms are 2-3 times shorter than the recultivation period in the conventional process using a soil humus layer removed from other soil areas.

These and other objects and advantages of the present invention will now be more fully apparent from the following detailed description.

DETAILED DESCRIPTION OF THE INVENTION

The industrial refuse heaps intended for recultivation include refuse heaps obtained as a result of extraction of various ores: iron, phosphorus, manganese and other, as well as in the extraction of coal; various ash heaps and the like are first smoothed out and, when required, the smoothed area is subjected to levelling. When a heap comprises a waste pile, its top is cut-off, followed by placing the refuse rock in a steplike manner. If a pH value of the refuse rock is low (2–3), this rock should be treated with a neutralizing agent. As the neutralizing agent use may be made of lime, wastes from soda manufacture, limestone and the like. However, it is preferable to use, as the neutralizing agent, wastes from soda manufacture containing a mixture of calcium oxide and calcium carbonate. The amount of wastes employed for neutralization of the refuse rock is calculated by the hydrolytic acidity of the particular refuse heap being recultivated.

A fertilizer containing biogenic elements (nitrogen, phosphorus, potassium) is introduced into the preconditioned area of the recultivated heap in an amount of from 1.5 to 2 kg per 1 $m^2$. As such fertilizer the use may be made of a ooze residue produced upon purification of production-communal waste waters. Thereafter, into the recultivated region of the refuse heap, according to the present invention, a humic preparation is introduced in the form of an aqueous suspension containing, in one liter, 4–7 g (as calculated for dry solids) of a culture *Aspergillus niger*. The amount of the humic preparation ranges from 80 to 100 g of the active principle per 1 $m^2$ of the recultivated area. The use of said humic preparation allows for a noticeable economic effect which is due to the fact that the preparation according to the present invention is made on the basis of carbonaceous shales contained in the refuse rock formed upon coal extraction and constituting waste products. These carbonaceous shales are a good nutrient medium for culturing *Aspergillus niger* producing humic acid and other organic compounds imparting biological activity to the preparation.

The humic preparation is formulated by way of culturing mold fungi *Aspergillus niger* producing humus on a nutrient medium containing carbonaceous shales. It is known that such carbonaceous shales contain carbon, iron, aluminium, nitrogen, sulphur, phosphorus, potassium, copper, boron, manganese. All these elements are inexpedient for the vital activity of the mold fungus *Aspergillus niger*, wherefore carbonaceous shales may be used as a nutrient medium for the fungus.

Carbonaceous shales are ground and a fraction with a particle size of not more than 1 $mm^2$ is collected in an amount of from 6 to 8% by mass. The fraction is mixed with water and into the resulting slurry there are added 20 to 40% by mass of a carbon source which comprises production wastes of confectionary factories containing 0.5 to 1% of sugar. Then this slurry comprising a nutrient medium is inoculated with the culture of the mold fungi *Aspergillus niger* producing humus and cultured at a temperature of from 25° to 30° C. for 10 to 15 days. The fungus biomass, products of its vital activity (humus and other organic compounds), residual amounts of carbonaceous shales—all these matters are employed as a humic preparation. In the preparation the content of humus is 3% by mass; the content of total nitrogen is 0.5% by mass.

The mold fungus *Aspergillus niger* employed according to the present invention is recovered from the refuse rock intended for recultivation and then grown on Czapek's nutrient medium at a temperature of 25°–30° C. to obtain an accumulation culture.

The use of the humic preparation for recultivation of refuse rocks makes it possible to avoid a complicated and time- and labour-consuming process of application of a natural humic layer taken-off from other rich soils, eliminate difficult operations and material expenses necessary to restore the latter soils.

After introduction of the humic preparation into the recultivated area, the latter is subjected to plowing to a depth of 15 to 20 cm and seeds of perennial grasses are sown into the thus-treated soil; usually, for this purpose use is made of a mixture of leguminous and gramineous cultures such as a mixture of Melilotus with Bromus, a mixture of clover with lovegrass and other suitable grass varieties. The rate of sowing is 0.015 to 0.020 kg of seeds per 1 $m^2$ of the recultivated area.

In accordance with the present invention, the sown region of the recultivated area is inoculated with the bacterial preparation "BNN" in the form of an aqueous suspension containing, in 1 l: 0.1–0.2 g (as calculated for dry solids) of a culture of ammonifying bacteria such as *Bacillus mycoides* 0.07–0.15 g of nitrifying bacteria such as *Nitrosomonas europea* and 0.08–0.15 g of *Nitrobacter Winogradskii*.

The amount of the preparation "BNN" introduced into the soil ranges from 0.25 to 0.5 g of the active principle per 1 m² of the recultivated area.

Bacteria of the preparation "BNN" take part in the processes of nitrogen conversion, i.e. they convert nitrogen from a hardly assimilable to a form readily assimilated by plants. Furthermore, as a result of metabolism of these bacteria there are formed such strong agents as ammonia and nitric acid which destroy the crystall lattice of minerals thus converting the refuse rock to soil.

In accordance with the present invention, the recultivated surface area is inoculated, during the plant sprouting period, with the bacterial preparation "AB" in the form of an aqueous suspension containing in one liter: 0.1 to 0.3 g (as calculated for dry solids) of an azotobacter microorganism such as *Azotobacter chroococcum* and 0.15–0.20 g of phosphate-dissolving bacteria such as *Bacillus megaterium*. The amount of the introduced preparation "AB" is 0.25–0.5 g of the active principle per 1 m² of the recultivated area.

During the period of plant tillering, according to the present invention, a repeated inoculating is carried out using the preparation "AB" of the same composition and in the same quantity as in the inoculation during the plant sprouting period. After inoculation the plants are sprayed with water.

The Azotobacter and phosphate-dissolving bacteria introduced into the recultivated area form, as a result of metabolism, and various organic compounds such as heterocyclic compounds, carboxylic acids, aminoacids, various vitamins which are most required during sprouting and tillering of plants. Furthermore, Azotobacter takes part in the synthesis of humus, while phosphate-dissolving bacteria convert phosphates from a sparingly soluble to a soluble form which is readily assimilated by plants.

Bacteria employed for the formulation of the preparation "AB" and "BNN" are preliminary recovered from refuse heaps to be recultivated. This process avoids a time-consuming operation associated with a special adaptation of soil bacteria of this species to the specific conditions of the refuse heaps to be recultivated. The recovery of said bacteria from the recultivated refuse heaps is not a difficult matter, since it is carried out following a conventional procedure. This procedure comprises sampling of the refuse material and dispersing the samples in water. The resulting aqueous suspension is used as an inoculation material for a conventional elective nutrient medium such aa peptone broth, Winogradsky medium, Derx medium, Pikowskaja medium and the like. An accumulation culture of nitrifying and ammonifying bacteria is grown on said media which is then employed for the formulation of the preparation BNN, while the accumulation culture Azotobacter and phosphate-dissolving bacteria are employed for the formulation of the preparation "AB".

Therefore, the process of recovery of bacteria from the refuse heaps to be recultivated is simple and accessible necessitating no considerable capital investments.

To produce the preparation "BNN", it is advisable to use the following bacteria: *Bacillus mycoides, Nitrosomonas europaea, Nitrobacter Winogradskii* featuring an increased biological activity compared to other species of ammonifying and nitrifying bacteria. The accumulation culture of ammonifying bacteria in an amount of 0.1–0.2 g (calculated for dry solids and accumulation culture of nitrifying bacteria in an amount of 0.07–0.15 g are suspended in water. This bacterial suspension mixture comprises the preparation "BNN" and is ready for use.

As regards the production of the preparation "AB", it is also prepared by suspending several accumulation cultures in water. To this end, the culture Azotobacter is used in an amount of 0.1 to 0.3 g (as calculated for dry solids) and the culture of phosphate-dissolving bacteria in an amount of 0.15–0.2 g (as calculated for dry solids), suspended in water and intermixed. The resulting bacterial suspension mixture comprises the preparation "AB" and is ready for use.

To prevent the preparations "BNN" and "AB" from loss of their initial activity, it is advisable to make-up these formulations directly before use thereof.

As it is seen from the above disclosure, the procedure for the manufacture of these preparations according to the present invention is rather simple.

The detailed description of the invention also shows that the process for recultivation of industrial refuse heaps requires no great power consumption rates, hardly available ingredients or special equipment; the process is simple in realization and, therefore, economically efficient; the procedure of preparation of the employed humic compositions "BNN" and "AB" is rather simple and accessible.

Owing to the fact, that for the preparation of said compositions use is made of the bacteria isolated from the heap to be recultivated, there is avoided any preliminary and lasting (1–2 years) adaptation of soil bacteria to the conditions of the heaps being recultivated.

The process according to the present invention makes it possible to effect cultivation of industrial refuse heaps even within one year. This means that the introduction of humic and bacterial preparations "BNN" and "AB" is effected only during the first vegetation period of the plant growth; there is no need in introduction of these preparations on the second year of recultivation.

All the above-indicated advantages may be readily attained by keeping to the strict sequence of the above-specified stages of the process and especially the above-mentioned sequence of inoculation with the preparations "BNN" and "AB". Failure to keep to this sequence will result in that the expected effect would not be accomplished and the soil-development process would be delayed.

For a better understanding of the present invention, some specific examples are given hereinbelow by way of illustration.

EXAMPLE 1

A refuse rock employed for recultivation consists of argillites, aleurolites and quartz sandstones with inclusions of pyrite; the refuse rock contains the following elements, percent by mass:

| | |
|---|---|
| total carbon | 9.9 |
| total iron | 47.7 |
| total aluminium | 8.7 |
| total nitrogen | 0.21 |
| total sulphur | 1.1 |

| -continued | |
|---|---|
| phosphates | 0.0069 |
| potassium | 0.01 |
| copper | 0.02 |
| boron | 0.17 |
| manganese | 0.27. |

The rock pH value is 2.45–3.56.

The refuse heap surface is smoothed out, levelled and divided to grounds (plots) with the size of 2 m². In order to neutralize toxic properties of the rock, 1 kg per 1 m² of the plot area of a neutralizing agent is introduced in each plot; as the neutralizing agent use is made of a mixture of CaO and $CaCO_3$. Thereafter, a fertilizer is introduced into the rock; the fertilizer comprises ooze residue obtained from purification of production-communal waste waters. The amount of the fertilizer is equal to 1.5 kg per 1 m² of the recultivated area. Afterwards, a humic preparation is introduced in the form of an aqueous suspension containing 4 g/l (as calculated for dry solids) of the culture of *Aspergillus niger*.

The humic preparation is introduced in the amount of 80 g (of the active principle) per 1 m² of the recultivated area. The thus-treated rock is subjectd to plowing to the depth of 20 cm and sown with seeds of perennial plants. For this purpose use is made of leguminous and gramineus varieties. The rate of seed sowing is 0.015 kg/m² of the recultivated area. Afterwards, the refuse heap surface area is inoculated with the preparation "BNN", while during sprouting and tillering of plants the preparation "AB" is used for inoculation. In said bacterial preparations the amount of the culture is expressed in grams of dry weight.

The rock inoculated with the seeds is inoculated with the bacterial preparation "BNN" in the form of an aqueous suspension containing in one liter: 0.1 g of the culture *Bacillus mycoides*, 0.07 g of the culture *Nitrosomonas europeae*, and 0.08 g of the culture *Nitrobacter Winogradskii*. Said bacteria are isolated from the starting rock taken for the recultivation. The amount of the preparation "BNN" introduced into the rock equals to 0.25 g of the active ingredient per 1 m² of the recultivated area. During the appearance of the plant sproutings inoculation is effected with the preparation "AB" in the form of an aqueous suspension containing in one liter: 0.1 g of the culture *Azotobacter chroococcum* and 0.15 g of the culture *Bacillus megaterium*. The amount of the preparation "AB" introduced into the soil is 0.25 g (of the active ingredient) per 1 m² of the recultivated area. Bacteria incorporated in the composition "AB" are also recovered from the starting rock employed for the recultivation.

During the tillering period a repeated inoculation is effected using the same composition "AB" having the same components and in the same amounts as in the case of inoculation during the plant sprouting period. The experiment is reproduced for 4 times.

The results illustrating variation of the chemical composition of the recultivated rock are shown in the Table hereinbelow.

EXAMPLE 2

Recultivation of a rock is effected in a manner similar to that described in the foregoing Example 1. The starting rock composition is the same as in Example 1. This example differs from Example 1 in a quantitative content of cultures of bacteria in the preparations "BNN" and "AB" and the amount of the preparation introduced into the rock being recultivated. The rock inoculation is effected using the bacterial preparation "BNN" in the form of an aqueous suspension containing in one liter: 0.2 g of the culture *Bacillus mycoides*, 0.15 g of the culture *Nitrosomonas europaea* and 0.15 g of the culture *Nitrobacter Winogradskii*. The amount of the preparation introduced into the rock equals to 0.5 g of the active component per 1 m² of the recultivated area.

During the period of sprouting and tillering of plants inoculation is effected using the bacterial preparation "AB" containing in one liter: 0.3 g of the culture *Azotobacter chroococcum* and 0.2 g of the culture *Bacillus megaterium*. The amount of this preparation introduced into the rock is 0.5 g of the active component per 1 m² of the recultivated area.

After inoculation, the plants are sprayed with water. The experiment is reproduced for 4 times.

The results illustrating variations of the chemical composition of the rock are shown in the Table hereinbelow. In the same Table there are given the data illustrating the control experiment performed without the treatment with the humic preparation and without inoculation with the bacterial preparations according to the present invention. As the control use is made of experimental plots treated only with the mixture of CaO and $CaCO_3$ for neutralization of toxic properties of the rock and with the fertilizer obtained from purification of the production-communal waste waters or so-called ooze residue.

TABLE

| | | | Chemical composition of the recultivated rock | | | | | | | | |
|---|---|---|---|---|---|---|---|---|---|---|---|
| Example | pH $H_2O$ | Hydrolytic acidity, mg.equiv./ 100 g | Total of exchange bases, mg.equiv. 100 g | $Fe_2O_3$, % | $Al_2O_3$, % | S, % | $C_{total}$, % | Humus, % | $N_{total}$, % | $K_2O$, mg/ 100g | $P_2O_5$, mg/ 100g |
| Control | 3.52 | 16.17 | 8.51 | 10.06 | 14.22 | 7.08 | 14.49 | 0.16 | 0.15 | 5.27 | 0.52 |
| Example 1 | 5.72 | 2.98 | 15.02 | 4.32 | 10.12 | 1.32 | 11.82 | 0.36 | 0.47 | 7.63 | 2.68 |
| Example 2 | 7.15 | 1.22 | 24.09 | 2.44 | 5.08 | 0.85 | 5.75 | 0.54 | 0.65 | 19.06 | 5.32 |

It is seen from the Table that in the recultivation of a refuse rock by the process according to the present invention and by the prior art process there is observed an increase of pH value, decrease of the content of iron, aluminium, sulphur and carbon. There occurs the process of accumulation of humus. The amount of mobile potassium and phosphorus, as well as the total content of nitrogen in the rock are increased.

The highest effect is obtained upon recultivation with bacterial preparations "BNN" and "AB" taken in the amount of 0.5 g/m² as calculated for the active ingredient.

It has been shown that in the plots recultivated by the process of the present invention there are created favourable conditions for processes of nitrification and mobilization of phosphorus and potassium, as well as trace elements. The activity of microorganisms introduced into the rock enables amelioration of agrochemical properties of the rock being recultivated. Introduction, into the rock, of microorganisms already adapted thereto accelerates the soil-development process, thus avoiding cultivation of the rock during the following year and, hence, repeated introduction of humic preparations, "BNN" and "AB" compositions. The process of sodding of heaps occurs simultaneously with the process of the soil-formation. It is possible to plant tree nursery stock in such grounds. Therefore, recultivation of refuse rocks is effected within one year compared to 3-7 years as in the prior art process. The process according to the present invention ensures landscaping of territories near miners' settlements and contributes to a better protection of the environments.

EXAMPLE 3

This Example illustrates the procedure of preparation of the bacterial composition "BNN".

Preparation of the composition "BNN" according to the present invention involves production of an accumulative culture by culturing, on an elective nutrient medium, of ammonifying bacteria *Bacillus mycoides* and nitrifying bacteria *Nitrosomonas europaea* and *Nitrobacter Winogradskii*.

Said bacteria are recovered from a refuse rock having the composition specified in Example 1 hereinbefore. The isolation of bacteria is effected following a conventional procedure comprising dispersing samples of the refuse rock in water under sterile conditions. The resulting aqueous suspension is used as an inoculation material for the production of an accumulation culture. The inoculation material is used to inoculate peptone broth for the growth of *Bacillus mycoides* and Winogradsky nutrient medium for growing *Nitrosomonas europeaea* and *Nitrobacter Winogradskii*. After a number of reinoculations, an accumulation culture of said bacteria is obtained on said nutrient media. The resulting accumulation culture of Bacillus mycoides in the amount of 0.1 g (as calculated for dry solids), the accumulation culture of *Nitrosomonas europaea* in the amount of 0.07 kg (as calculated for dry solids) and *Nitrobacter Winogradskii* in the amount of 0.08 g (calculated for dry solids) are suspended and intermixed in water. All operations are carried out under sterile conditions. The resulting bacterial suspension is a ready-to-use preparation referred to, as it has been mentioned hereinbefore, as "BNN".

In order to avoid decrease of the preparation's activity, it is advisable to produce the preparation "BNN" directly prior to the use thereof.

An advantage of the preparation "BNN" resides in a simple procedure for its manufacture and especially that the bacteria incorporated therein are already adapted to the refuse rock conditions, whereby the soil-development process is considerably accelerated.

EXAMPLE 4

This Example illustrates the manufacture of the bacterial preparation "AB" according to the present invention.

The procedure of manufacture of the preparation "AB" involves preparation of an accumulation culture by culturing, on an elective nutrient medium, the microorganism *Azotobacter chroococcum* and phosphate-dissolving microorganisms *Basillus megaterium*.

Said bacteria are recovered from a refuse rock of the compositions specified in Example 1 hereinbefore. The isolation of bacteria is carried out following the procedure described in Example 3. The inoculation material is used to inoculate the Derx nutrient medium for growing *Azotobacter chroococcum* and Pikowskaja medium for growing *Bacillus megaterium*. After a number of re-inoculations the stock culture of said bacteria is obtained on said nutrient media. The resulting accumulation (stock) culture *Azotobacter chroococcum* in the amount of 0.1 g (as calculated for dry solids) and the stock culture *Bacillus megaterium* in the amount of 0.15 g (as calculated for dry solids) is suspended and intermixed in water. All operations are carried out under sterile conditions. The resulting bacterial suspension comprises a ready-to-use preparation referred to, as it has been mentioned hereinbefore, as "AB" preparation.

To maintain a constant activity level of the preparation "AB", it is advisable to produce it directly prior to the use of the preparation.

An advantage of this preparation is a simple procedure of its manufacture and the fact that the bacteria incorporated therein are already adapted to the refuse rock conditions, whereby the soil-development process is substantially accelerated.

EXAMPLE 5

The present Example illustrates the preparation of a humic composition.

The humic composition according to the present invention is prepared by culturing mold fungi *Aspergillus niger* producing humus on a nutrient medium containing carbonaceous shales.

Said fungo *Aspergillus niger* are recovered from a refuse rock of the composition described in Example 1 hereinbefore. Recovery of the fungi is carried out following a conventional procedure comprising taking samples of the refuse rock and dispersing thereof in water. The resulting aqueous suspension is employed as the inoculation material for the preparation of a stock culture of said mold fungus. To this end, the above aqueous suspension is used to inoculate Czapek's nutrient medium and the stock culture of *Aspergillus niger* is grown thereon. This stock culture of the fungus is used to prepare the humic preparation which involves culturing of the isolated culture of *Aspergillus niger* on a nutrient medium containing carbonaceous shales. To do so, the carbonaceous shales are ground, a fraction with the particle size of not more than 1 mm$^2$ is collected in the amount of 70 g and suspended in 0.8 l of water. Into the resulting suspension there is added 0.2 l of waste waters from food-production plants which serve as the source of carbon and contain 5 g/l of sugar; also introduced into the suspension are 10 ml of the stock culture of *Aspergillus niger*. The culturing process is carried out at the temperature of 28° C. over the period of 12 days. All operations are conducted under sterile conditions.

The resulting cultural mixture containing the fungus biomass, humus and residual amounts of carbonaceous shales comprises the desired humic composition. The composition contains humus in the amount of 3% by mass and the content of total nitrogen therein is 0.5% by mass.

An advantage of this humic composition according to the present invention resides in that for its preparation use is made, as the starting components, of production wastes from coal-mining and food industries including waste waters from confectionery plants.

What is claimed is:

1. A microbiological process for recultivation of industrial refuse heaps consisting in the following steps performed in the succession specified hereinbelow:
   (a) smoothing out the industrial refuse heaps;
   (b) introduction thereinto of a fertilizer resulting from purification of production-communal waste waters;
   (c) introduction thereinto of a humic preparation containing a culture of the mold fungus *Aspergillus niger* producing humus and isolated from said refuse heaps;
   (d) plowing;
   (e) sowing seeds of perennial plants;
   (f) inoculation of the sown surface of refuse heaps with a bacterial preparation containing a culture of ammonifying and nitrifying bacteria recovered from said refuse heaps;
   (g) inoculation of the heap surface with a bacterial preparation containing a culture of azotobacter and phosphate-dissolving bacteria recovered from said refuse heaps during the period of plant sprouting and tillering;
   (h) watering of the plants.

2. A process according to claim 1, wherein the humic preparation is used as an aqueous suspension containing in one liter 4–7 g (as calculated for dry solids) of the culture of the mold fungus *Aspergillus niger*.

3. A process according to claim 2, wherein the amount of the humic preparation is 80 to 100 g of the active ingredient per 1 m$^2$ of the recultivated area.

4. A process according to claim 1, wherein said inoculation of refuse heaps is effected using the bacterial preparation in the form of an aqueous suspension containing in one liter: 0.1–0.2 g (as calculated for dry solids) of the culture *Bacillus mycoides*, 0.07–0.15 g (as calculated for dry solids) of the culture *Nitrosomonas europaea* and 0.08–0.15 g (as calculated for dry solids) of the culture *Nitrobacter Winogradskii*.

5. A process according to claim 4, wherein the rate of application of the bacterial preparation is 0.25 to 0.5 g per 1 m$^2$ of the recultivated area.

6. A process according to claim 1, wherein said inoculation in the step (g) during the period of the plant sprouting and tillering is effected using the bacterial preparation in the form of an aqueous suspension containing in one liter (g of dry solids): 0.1–0.3 of the culture *Azotobacter chroococcum* and 0.15–0.2 of the culture *Bacillus megaterium*.

7. A process according to claim 6, wherein the rate of application of the bacterial preparation is 0.25 to 0.5 g of the active ingredient per 1 m$^2$ of the recultivated area.

* * * * *